US010963859B2

(12) United States Patent
Park et al.

(10) Patent No.: US 10,963,859 B2
(45) Date of Patent: Mar. 30, 2021

(54) MOBILE PAYMENT PROCESSING SYSTEM AND METHOD THEREFOR

(71) Applicant: HAREXINFOTECH INC., Seoul (KR)

(72) Inventors: Kyung Yang Park, Seoul (KR); Hoon Joon Jeong, Gunpo-si (KR)

(73) Assignee: HAREXINFOTECH INC., Seoul (KR)

( * ) Notice: Subject to any disclaimer, the term of this patent is extended or adjusted under 35 U.S.C. 154(b) by 1471 days.

(21) Appl. No.: 14/776,079

(22) PCT Filed: Mar. 13, 2014

(86) PCT No.: PCT/KR2014/002133
§ 371 (c)(1),
(2) Date: Sep. 14, 2015

(87) PCT Pub. No.: WO2014/142587
PCT Pub. Date: Sep. 18, 2014

(65) Prior Publication Data
US 2016/0026992 A1 Jan. 28, 2016

(30) Foreign Application Priority Data
Mar. 13, 2013 (KR) .................. 10-2013-0026796

(51) Int. Cl.
G06Q 20/10 (2012.01)
G06Q 20/32 (2012.01)
(Continued)

(52) U.S. Cl.
CPC ......... *G06Q 20/325* (2013.01); *G06Q 20/202* (2013.01); *G06Q 20/32* (2013.01);
(Continued)

(58) Field of Classification Search
USPC .......................................... 705/44
See application file for complete search history.

(56) References Cited

U.S. PATENT DOCUMENTS

2010/0088188 A1 4/2010 Kumar et al.
2011/0251892 A1 10/2011 Laracey
(Continued)

FOREIGN PATENT DOCUMENTS

CN 101378312 A 3/2009
CN 102779302 A 11/2012
(Continued)

OTHER PUBLICATIONS

International Searching Authority, International Search Report for PCT/KR2014/002133 dated May 22, 2014.
(Continued)

*Primary Examiner* — Hani M Kazimi
*Assistant Examiner* — Hatem M Ali
(74) *Attorney, Agent, or Firm* — Sughrue Mion, PLLC

(57) ABSTRACT

Provided is a mobile payment processing system and method. When making a payment request, an affiliated store terminal directly generates transaction identification (T-ID) information and provides the generated T-ID information to a mobile terminal, and a user of the mobile terminal can use a rapid mobile payment service since the payment can be processed without waiting a response signal of a payment processing server receiving a payment request signal. Further, since user datagram protocol (UDP) communication is performed between the affiliated store terminal and a payment processing result notification server while a mobile payment is performed, the payment processing result notification server and the affiliated store terminal are provided so as to directly inquire a transaction state in the affiliated store terminal when the payment is completed by the mobile terminal.

21 Claims, 14 Drawing Sheets

(51) Int. Cl.
*G06Q 20/40* (2012.01)
*G06Q 20/20* (2012.01)

(52) U.S. Cl.
CPC ..... *G06Q 20/3226* (2013.01); *G06Q 20/3274* (2013.01); *G06Q 20/3276* (2013.01); *G06Q 20/40* (2013.01); *G06Q 20/405* (2013.01)

(56) References Cited

U.S. PATENT DOCUMENTS

| | | |
|---|---|---|
| 2012/0209735 A1 | 8/2012 | Subramanian et al. |
| 2012/0267432 A1 | 10/2012 | Kuttuva |
| 2013/0246203 A1 | 9/2013 | Laracey |
| 2014/0106770 A1* | 4/2014 | Valentin ............ H04W 72/1205 455/452.1 |
| 2015/0134538 A1* | 5/2015 | Kim ....................... G06Q 20/34 705/71 |
| 2016/0217448 A1 | 7/2016 | Laracey |

FOREIGN PATENT DOCUMENTS

| | | |
|---|---|---|
| CN | 102934132 A | 2/2013 |
| JP | 2008-278410 A | 11/2008 |
| JP | 2012-505475 A | 3/2012 |
| KR | 10-2009-0044954 A | 5/2009 |
| KR | 10-2012-0075578 A | 7/2012 |
| KR | 10-2013-0012249 A | 2/2013 |

OTHER PUBLICATIONS

European Patent Office, Communication dated Nov. 8, 2016 in counterpart European Application No. 14 76 5458.

Communication dated May 17, 2018, from the State Intellectual Property Office of People's Republic of China in counterpart Application No. 201480026410.1.

Communication dated Jan. 14, 2020 by the Indian Patent Office in application No. 9519/DELNP/2015.

* cited by examiner

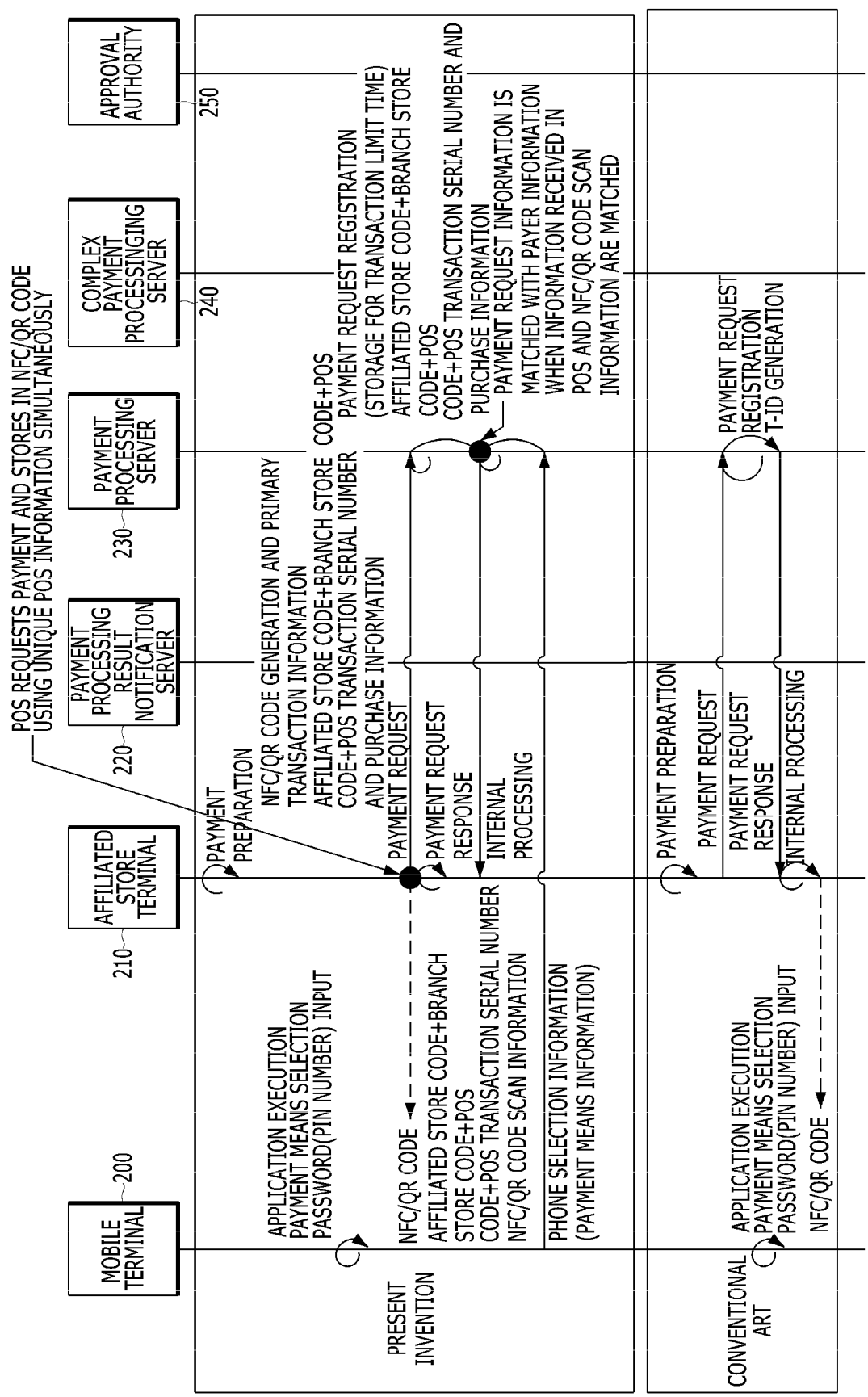

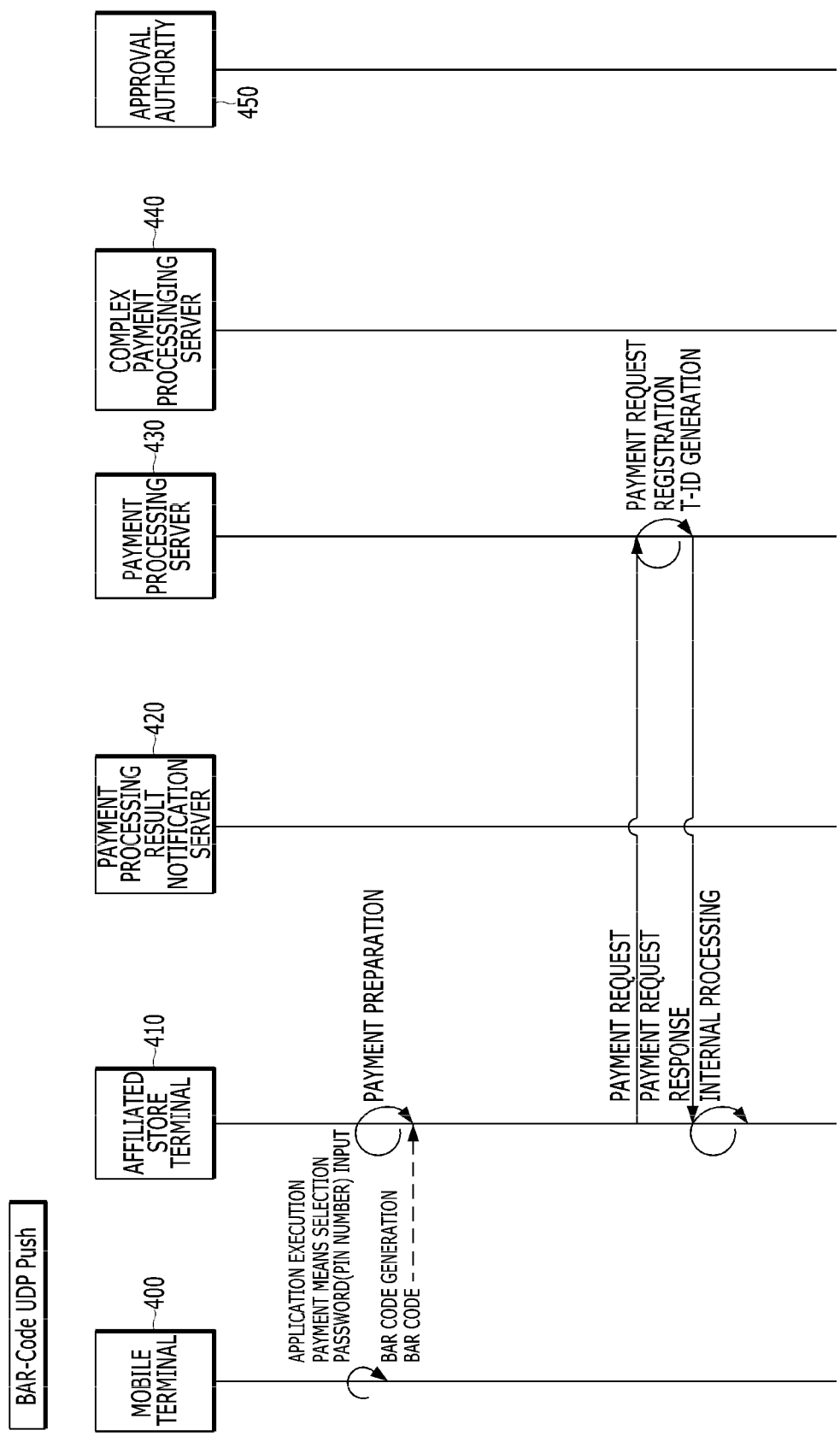

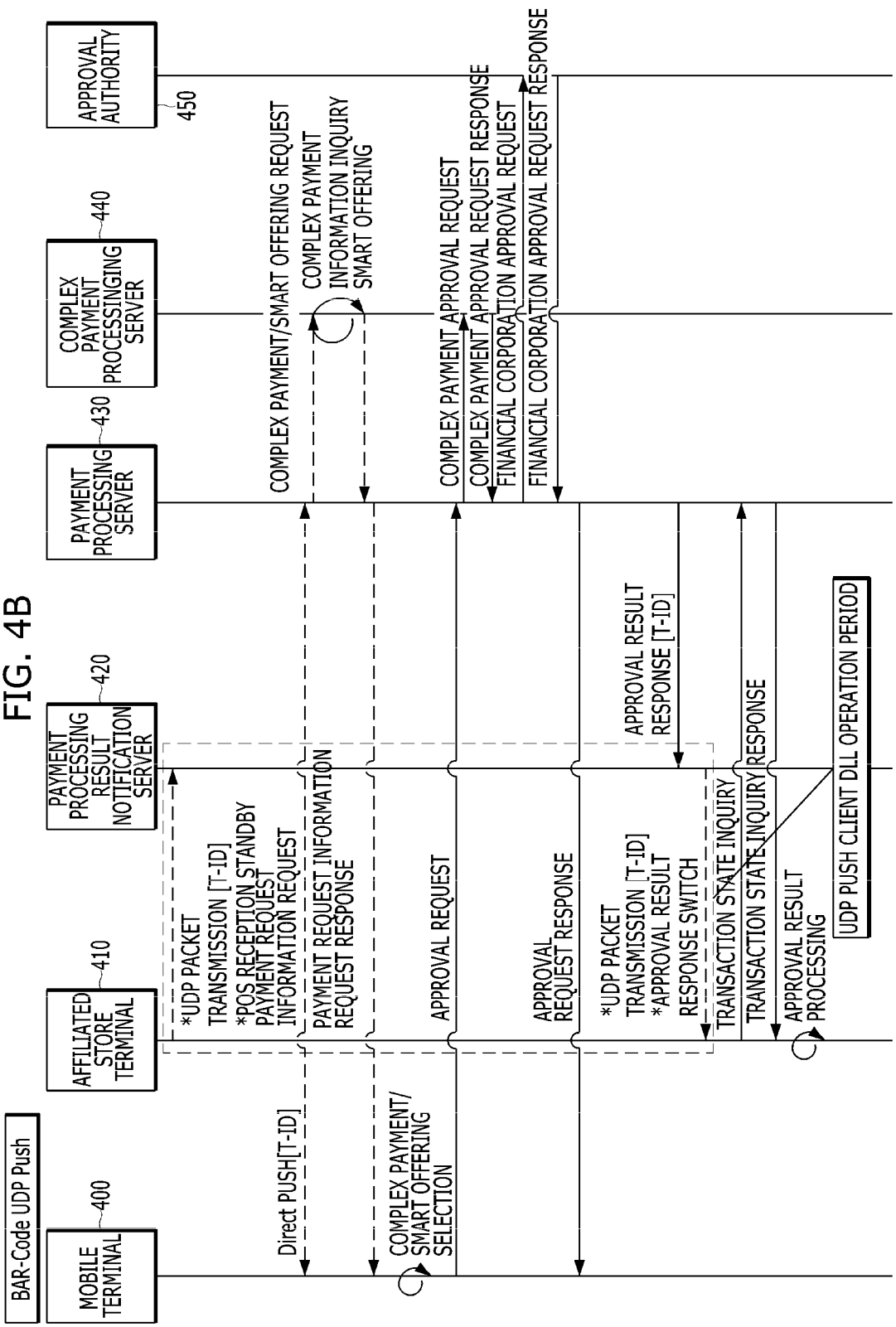

MOBILE PAYMENT PROCESSING SYSTEM AND METHOD THEREFOR

CROSS REFERENCE TO RELATED APPLICATIONS

This application is a National Stage of International Application No. PCT/KR2014/002133 filed Mar. 13, 2014, claiming priority based on Korean Patent Application No. 10-2013-0026796 filed Mar. 13, 2013, the contents of all of which are incorporated herein by reference in their entirety.

TECHNICAL FIELD

The following description relates to a mobile payment processing system and method performing a mobile payment by a mobile terminal of a customer, and more particularly, to a mobile payment processing system and method including an affiliated store terminal capable of performing a mobile payment by a mobile terminal of a customer and a payment processing server performing the mobile payment with the affiliated store terminal.

BACKGROUND

According to popularization of a mobile terminal such as a smart phone, a payment using the mobile terminal is mainly used when performing a payment in a store, etc.

Generally, the payment through the mobile terminal is performed by the mobile terminal used by a customer, an affiliated store terminal used in the store, etc., and a payment processing server processing the payment while communicating with two terminals.

Among them, there is a mobile terminal-lead payment method in which the mobile terminal requests the payment to the payment processing server as follows.

The mobile terminal-lead payment method is a method in which a seller inputs a payment amount, etc. through the affiliated store terminal and prepares the payment, and the customer executes an application, etc. in the mobile terminal and prepares the payment, for the payment through the mobile terminal.

Further, when the seller inputs the payment amount, etc. and a payment request command, the affiliated store terminal transmits payment-related information (an affiliated store code, a branch store code, a terminal code, a transaction serial number, and purchase information, etc.) to the payment processing server and makes a payment request, and the payment processing server receiving the payment request generates a transaction identification (T-ID) information based on the payment-related information, registers payment request information, and transmits a payment request response signal including the generated T-ID information to the affiliated store terminal.

The affiliated store terminal receiving the payment request response signal from the payment processing server generates a tag (for example, an radio frequency (RF) tag, a barcode, etc.) including the T-ID information included in the payment request response signal, and displays the generated tag so as to be recognized by the mobile terminal.

The mobile terminal recognizes the tag, obtains the T-ID information, and transmits a payment approval request signal including the T-ID information to the payment processing server, and the payment processing server receiving the payment approval request signal confirms the registered payment request based on the T-ID information, and performs the payment through communication with an approval authority (for example, a financial institution) server. When the payment is completed, the payment processing server transmits a response signal to the payment approval request signal to the mobile terminal.

However, in a conventional mobile payment method, the payment processing server receiving the payment-related information from the affiliated store terminal generates the T-ID information, transmits the generated T-ID information to the affiliated store terminal, and performs a process for the payment in the mobile terminal. Accordingly, there is a problem in which the payment by the mobile terminal is not performed and is on standby until the affiliated store terminal receives the T-ID information from the payment processing server.

Also, in the conventional mobile payment method, unless the payment-related information is transmitted to the payment processing server and the communication with the payment processing server is continuously maintained in the process of performing an operation in which the affiliated store terminal initially transmits the payment information to the mobile terminal, the payment processing server cannot inform the affiliated store terminal of whether the payment is processed.

That is, in the mobile terminal-lead payment method, the payment processing server cannot know network address information of the affiliated store terminal, and even though the mobile terminal transmits the network address information of the affiliated store terminal to the payment processing server when requesting the payment, it is because the payment processing server cannot reconnect to the affiliated store terminal even though the payment processing server knows a private Internet protocol (IP) address of the affiliated store terminal since current many affiliated store terminals are located in a next end of a private router and use the private IP address. As a result, in a current communication infrastructure, the affiliated store terminal has to maintain the connection with the payment processing server until the payment process is completed so as to receive a payment processing result from the payment processing server, and in this case, there is a problem in which the affiliated store terminal cannot perform the payment process for a next customer.

Accordingly, there is a problem in which a situation in which the payment between the mobile terminal of the customer and the payment processing server is processed and whether the payment is completed cannot be confirmed in the affiliated store terminal.

Therefore, when processing the payment in which the mobile terminal leads, there are an inconvenience in which the affiliated store terminal cannot immediately know the payment situation by the mobile terminal of the customer, and a problem in which the completion of the payment is delayed since the affiliated store terminal has to check the payment result by connecting to the payment processing server and after confirming whether the payment is completed to the customer using the mobile terminal.

SUMMARY

One aspect of the present invention provides an affiliated store terminal, including: a transaction identification information generation unit configured to generate transaction identification (T-ID) information based on payment-related information; a transaction identification information provision unit configured to provide the T-ID information generated by the transaction identification information generation unit so that a mobile terminal recognizes; a payment request transmission unit configured to transmit a payment request signal including the payment-related information to a payment processing server, and receive a payment request response signal including the T-ID information from the payment processing server; a payment approval confirmation request unit configured to transmit a user datagram protocol (UDP) packet including the T-ID information to a payment processing result notification server when receiving the payment request response signal, and receive a first response signal from the payment processing result notification server; and a payment approval confirmation unit configured to receive a UDP packet for a payment processing result notification including the T-ID information from the payment processing result notification server, and when receiving the UDP packet for the payment processing result notification, transmit a second response signal to the payment processing result notification server, and transmit a transaction state inquiry signal to the payment processing server, The transaction identification information generation unit may generate the T-ID information based on an affiliated store code, a branch store code, a terminal code, a transaction serial number, and purchase information, and the payment request transmission unit may transmit the payment-related information or a payment request signal including the T-ID information to the payment processing server.

The payment request transmission unit may receive a payment request response signal including the T-ID information generated by the payment processing server based on the payment-related information from the payment processing server.

The payment approval confirmation request unit may transmit the UDP packet again when the first response signal is not received from the payment processing result notification server within a predetermined time after transmitting the UDP packet.

When the payment approval confirmation request unit does not receive the first response signal within a predetermined time after transmitting the UDP packet for the first time, the payment approval confirmation unit may output a pop-up window for receiving a payment processing result inquiry command from a user, when the payment approval confirmation request unit does not receive the first response signal while transmitting the UDP packet by a predetermined number of times, the payment approval confirmation unit may output a pop-up window for receiving a payment processing result inquiry command from a user, or when the payment approval confirmation request unit does not receive the UDP packet for the payment processing result notification within a predetermined time after receiving the first response signal, the payment approval confirmation unit may output a pop-up window for receiving a payment processing result inquiry command from a user.

Another aspect of the present invention provides a payment processing server, including: a payment request registration unit configured to receive a payment request signal including payment-related information or T-ID information from an affiliated store terminal, and register a payment request when receiving the payment request signal; and a payment approval request processing unit configured to receive a payment approval request signal including the T-ID information from a mobile terminal, inquire the registered payment request based on the T-ID information included in the payment approval request signal when receiving the payment approval request signal, and process the payment approval request.

The payment request registration unit may generate the T-ID information based on the payment-related information when the T-ID information is not included in the payment request signal transmitted from the affiliated store terminal, register the payment request, and delete the registered payment request when the payment approval request signal including the T-ID information included in the payment request is not received within a predetermined time after the payment request is registered.

The payment approval request processing unit may inquire whether the payment request including T-ID information identical to the T-ID information included in the payment approval request signal is registered when receiving the payment approval request signal, and process the payment approval request when it is confirmed that the payment request is registered.

Still another aspect of the present invention provides a payment processing result notification device, including: a first communication unit configured to receive a UDP packet including T-ID information from an affiliated store terminal receiving a payment request response signal including the T-ID information from a payment processing server, and transmit a first response signal to the affiliated store terminal when receiving the UDP packet; a UDP address registration unit configured to register UDP address information of the affiliated store terminal confirmed from the UDP packet using the T-ID information as an index; and a second communication unit configured to transmit a UDP packet for a payment processing result notification including the T-ID information to the affiliated store terminal when receiving payment processing result information from the payment processing server, and receive a second response signal from the affiliated store terminal receiving the UDP packet for the payment processing result notification.

When the second response signal is not received within a predetermined time after transmitting the UDP packet for the payment processing result notification, the second communication unit may transmit the UDP packet for the payment processing result notification again, and the UDP address registration unit may confirm whether T-ID information identical to the T-ID information in the received UDP packet is registered when receiving the UDP packet including the T-ID information, and when the T-ID information identical to the T-ID information in the received UDP packet is registered, delete UDP address information having the previously registered T-ID information as an index.

Yet another aspect of the present invention provides a mobile payment processing system, including: an affiliated store terminal configured to generate T-ID information based on payment-related information, transmit a payment request signal including the T-ID information, and provide the T-ID information to a mobile terminal; a payment processing server configured to register a payment request when receiving the payment request signal, inquire a payment request registered based on the T-ID information included in a payment approval request signal when receiving the payment approval request signal transmitted by the mobile terminal obtaining the T-ID information, and process a payment approval request; and a payment processing result notification server, wherein the affiliated store terminal transmits a UDP packet including the T-ID information to the payment processing result notification server when receiving a payment request response signal corresponding to the payment request signal transmitted to the payment processing server, the payment processing result notification server transmits a UDP packet for a payment processing result notification including the T-ID information to the affiliated store terminal when receiving payment processing result information from the payment processing server, and the affiliated store terminal inquires a transaction state by connecting to the payment processing server when receiving the UDP packet for the payment processing result notification.

Yet another aspect of the present invention provides a mobile payment processing method performed in an affiliated store terminal, including: generating T-ID information based on payment-related information; transmitting a payment request signal including the T-ID information to a payment processing server; providing the T-ID information so that a mobile terminal recognizes; receiving a payment request response signal from the payment processing server receiving a payment approval request signal transmitted by the mobile terminal obtaining the T-ID information; transmitting a UDP packet including the T-ID information to a payment processing result notification server when receiving the payment request response signal; receiving a UDP packet for a payment processing result notification including the T-ID information from the payment processing result notification server receiving payment processing result information from the payment processing server; and inquiring a transaction state by connecting to the payment processing server when receiving the UDP packet for the payment processing result notification.

Yet another aspect of the present invention provides a mobile payment processing method performed in an affiliated store terminal, including: transmitting a payment request signal to a payment processing server; receiving a payment request response signal including T-ID information from the payment processing server; transmitting a UDP packet including the T-ID information to a payment processing result notification server when receiving the payment request response signal; receiving a first response signal from the payment processing result notification server receiving the UDP packet; receiving a UDP packet for a payment processing result notification including the T-ID information transmitted by the payment processing result notification server receiving payment processing result information from the payment processing server; and transmitting a second response signal to the payment processing result notification server and inquiring a payment processing result by connecting to the payment processing server.

BRIEF DESCRIPTION OF THE DRAWINGS

FIGS. 2A and 2B are flowcharts for describing an operation in which a mobile payment processing system processes a payment according to an exemplary embodiment of the present invention;

FIGS. 3A, 3B, 4A and 4B are flowcharts for describing an operation of performing a mobile payment using an affiliated store terminal and a payment processing result notification server according to an exemplary embodiment of the present invention;

DETAILED DESCRIPTION OF EMBODIMENTS

The above and other objects, features, and advantages of the present invention will become more apparent to those of ordinary skill in the art by describing in detail exemplary embodiments thereof with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims.

Meanwhile, the terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Hereinafter, exemplary embodiments of the present invention will be described in detail with reference to the accompanying drawings.

Figure 1:
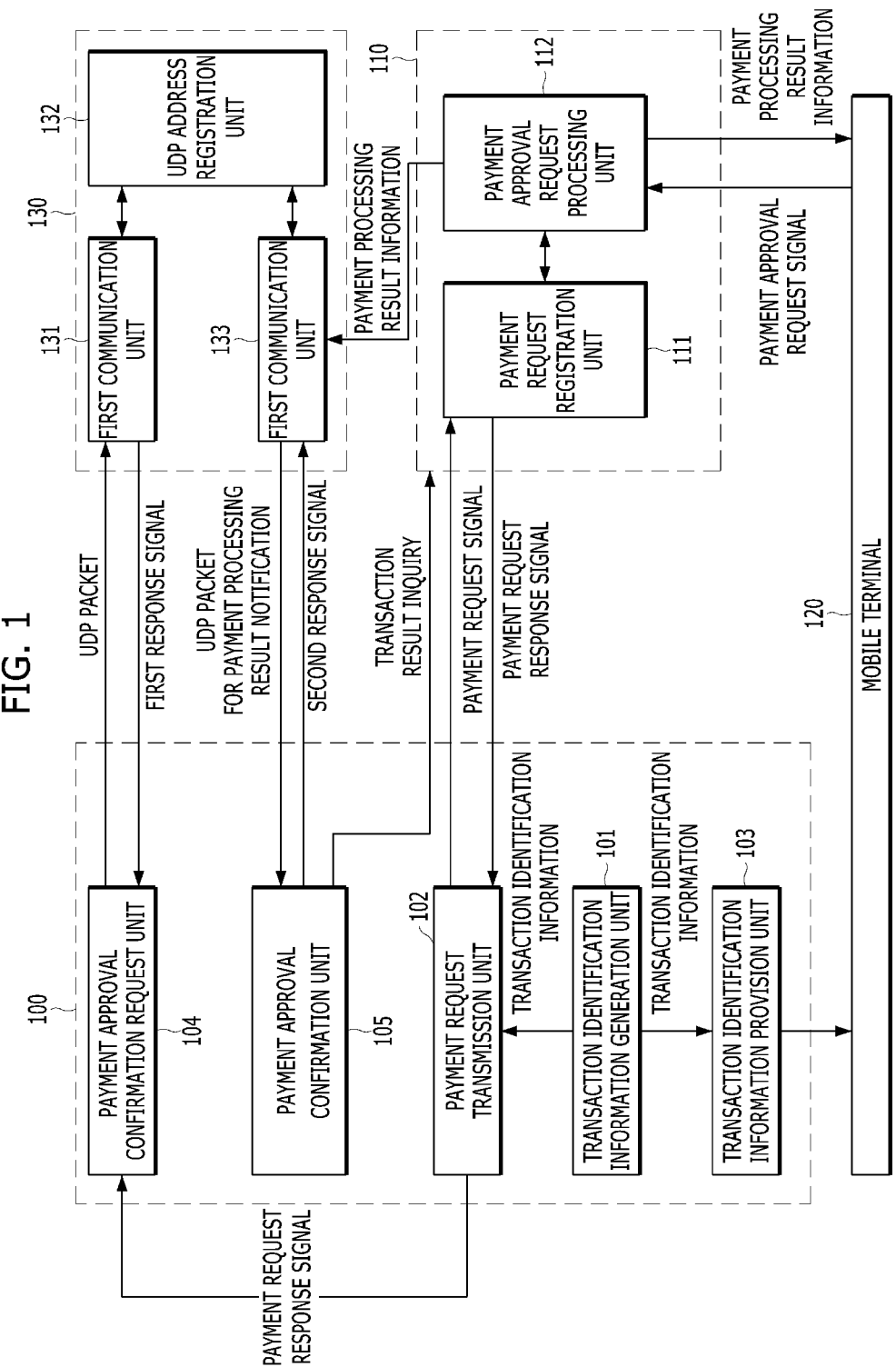
FIG. 1 is a block diagram illustrating a configuration of an affiliated store terminal and a payment processing server according to an exemplary embodiment of the present invention.

FIG. 1 is a block diagram illustrating a configuration of an affiliated store terminal 100, a payment processing server 110, and a payment processing result notification server 130 according to an exemplary embodiment of the present invention.

The affiliated store terminal 100 according to an exemplary embodiment of the present invention may include a transaction identification information generation unit 101, a payment request transmission unit 102, a transaction identification information provision unit 103, a payment approval confirmation request unit 104, and a payment approval confirmation unit 105.

The transaction identification information generation unit 101 may generate transaction identification (T-ID) information based on payment-related information when a product name, a product volume, etc. are input through the affiliated store terminal 100 and a seller inputs a payment request command after calculation of a payment amount is completed. The payment-related information may include an affiliated store code, a branch store code, a terminal code, a transaction serial number, and purchase information, etc., and mean information capable of identifying a payment request transmitted to the payment processing server 110.

The T-ID information may mean information capable of identifying a transaction, and according to an exemplary embodiment, may be configured by the affiliated store code+the branch store code+the terminal code+the transaction serial number+the purchase information. For example, when the affiliated store code is 10, the branch store code is 01, the terminal code is 01, the transaction serial number is 0016, and the purchase information is 02840005 (when a purchased goods code is 0284 and the number of the purchased goods is 5), the T-ID information may be 100101001602840005.

The transaction identification information generation unit 101 may generate the T-ID information, and transmit the generated T-ID information to the payment request transmission unit 102 and the transaction identification information provision unit 103.

The payment request transmission unit 102 may transmit a payment request signal to the payment processing server 110 when a payment request command is input through the affiliated store terminal 100.

A conventional method transmits the payment request signal including only the payment-related information when transmitting the payment request signal, but the present invention may transmit the payment request signal including the payment-related information or the transaction identification information generated by the transaction identification information generation unit 101.

The transaction identification information provision unit 103 may receive the T-ID information and the transaction-related information generated by the transaction identification information generation unit 101, and provide the T-ID information and the transaction-related information to the mobile terminal.

A method of providing the information may be performed by contactless wireless communication method such as radio frequency (RF) communication, optical communication, infrared-ray communication, etc., or use one among tags capable of recognizing through a mobile terminal 120 such as an RF tag, an near field communication (NFC) tag, a quick response (QR) code, or a barcode, etc.

That is, the transaction identification information provision unit 103 may receive the T-ID information and the transaction-related information, and provide the T-ID information and the transaction-related information to a user of the mobile terminal 120 through a receiver or a screen, etc. of the affiliated store terminal 100 so that the user of the mobile terminal 120 recognizes them.

Accordingly, in the conventional method, the payment request transmission unit 102 may transmit the payment request signal to the payment processing server 110, and provide the T-ID information to the mobile terminal 120 after confirming the T-ID information included in a payment request response signal transmitted from the payment processing server 110, but the affiliated store terminal 100 according to an exemplary embodiment of the present invention may transmit the payment request signal to the payment processing server 110 and provide the T-ID information to the mobile terminal 120 simultaneously.

The payment approval confirmation request unit 104 may transmit a user datagram protocol (UDP) packet to the payment processing result notification server 130 when receiving the payment request response signal from the payment processing server 110 corresponding to the payment request signal transmitted by the payment request transmission unit 102, and receive a first response signal corresponding thereto.

The payment approval confirmation unit 105 may transmit a second response signal to the payment processing result notification server 130 when receiving a UDP packet for a payment processing result notification from the payment processing result notification server 130, transmit a transaction result inquiry signal to the payment processing server 110, and confirm whether the payment is approved.

The payment processing server 110 according to an exemplary embodiment of the present invention may include a payment request registration unit 111, and a payment approval request processing unit 112.

The payment request registration unit 111 may confirm the T-ID information included in the payment request signal when receiving the payment request signal from the affiliated store terminal 100, and register the payment request of the affiliated store terminal 100 using the T-ID information as an identifier.

The payment request registration unit 111 may generate the T-ID information based on the payment-related information and register the payment request when the payment request signal transmitted from the affiliated store terminal 100 does not include the T-ID information and include only the payment-related information.

The payment request registration unit 111 may store the registered payment request only within a predetermined time (a transaction limit time), and delete a corresponding payment request and clean up the payment request which is not processed when the approval request to the registered payment request is not received within the predetermined time after registering the payment request.

The payment approval request processing unit 112 may receive the payment approval request signal from the mobile terminal 120, inquire whether the payment request corresponding to the received payment approval request signal is registered, and process the corresponding payment request.

The mobile terminal 120 may recognize the T-ID information provided from the affiliated store terminal 100, and transmit the payment approval request signal including the T-ID information to the payment processing server 110 when the approval request to the corresponding payment is input through an application, etc. which is being executed in the mobile terminal 120.

The payment approval request processing unit 112 of the payment processing server 110 may confirm the T-ID information included in the received payment approval request signal when receiving the payment approval request signal, and confirm whether there is the payment request using the T-ID information as an identifier while the payment request which is previously registered is processed. When the payment request having the same T-ID information is confirmed, an operation of processing the corresponding payment request may be performed.

The payment approval request processing unit 112 may request the payment process by connecting to an approval authority server such as a financial corporation, a card corporation, etc. in order to process the payment request, and allow one or more payment means to perform the payment process for all or a portion of a payment amount by connecting to a complex payment processing server when there is a complex payment processing request based on a cash, a card, a coupon, or a point, etc.

The payment approval request processing unit 112 may transmit payment processing result information to the mobile terminal 120 and the payment processing result notification server 130 when the process for the payment request is completed.

The payment processing result notification server 130 according to an exemplary embodiment of the present invention may include a first communication unit 131, a UDP address registration unit 132, and a second communication unit 133.

The first communication unit 131 may receive the UDP packet including the T-ID information transmitted from the affiliated store terminal 100, and transmit a first response signal corresponding to the reception of the UDP packet to the affiliated store terminal 100.

The UDP address registration unit 132 may store UDP address information of the affiliated store terminal 100 having the T-ID information as an index when receiving the UDP packet including the T-ID information from the affiliated store terminal 100.

As another exemplary embodiment, since there is a case in which the affiliated store terminal 100 does not receive the first response signal and continuously transmits the UDP packet including the same T-ID information, in order to cope with this case, the affiliated store terminal 100 may be configured to confirm whether the UDP address information having the same T-ID information as an index is previously registered when receiving the UDP packet, delete previously registered UDP address information when the UDP address information having the same T-ID information as the index is already registered, and register new UDP address information.

The second communication unit 133 may confirm an UDP address of the affiliated store terminal of a corresponding transaction using the T-ID information as the index when receiving result information on the payment approval including the T-ID information from the payment processing server 110, transmit the UDP packet for the payment processing result notification including the T-ID information based on the confirmed result to the affiliated store terminal 100 based on the confirmed UDP address, and receive the second response signal corresponding to the UDP packet for the payment processing result notification from the affiliated store terminal 100.

Figure 2B:
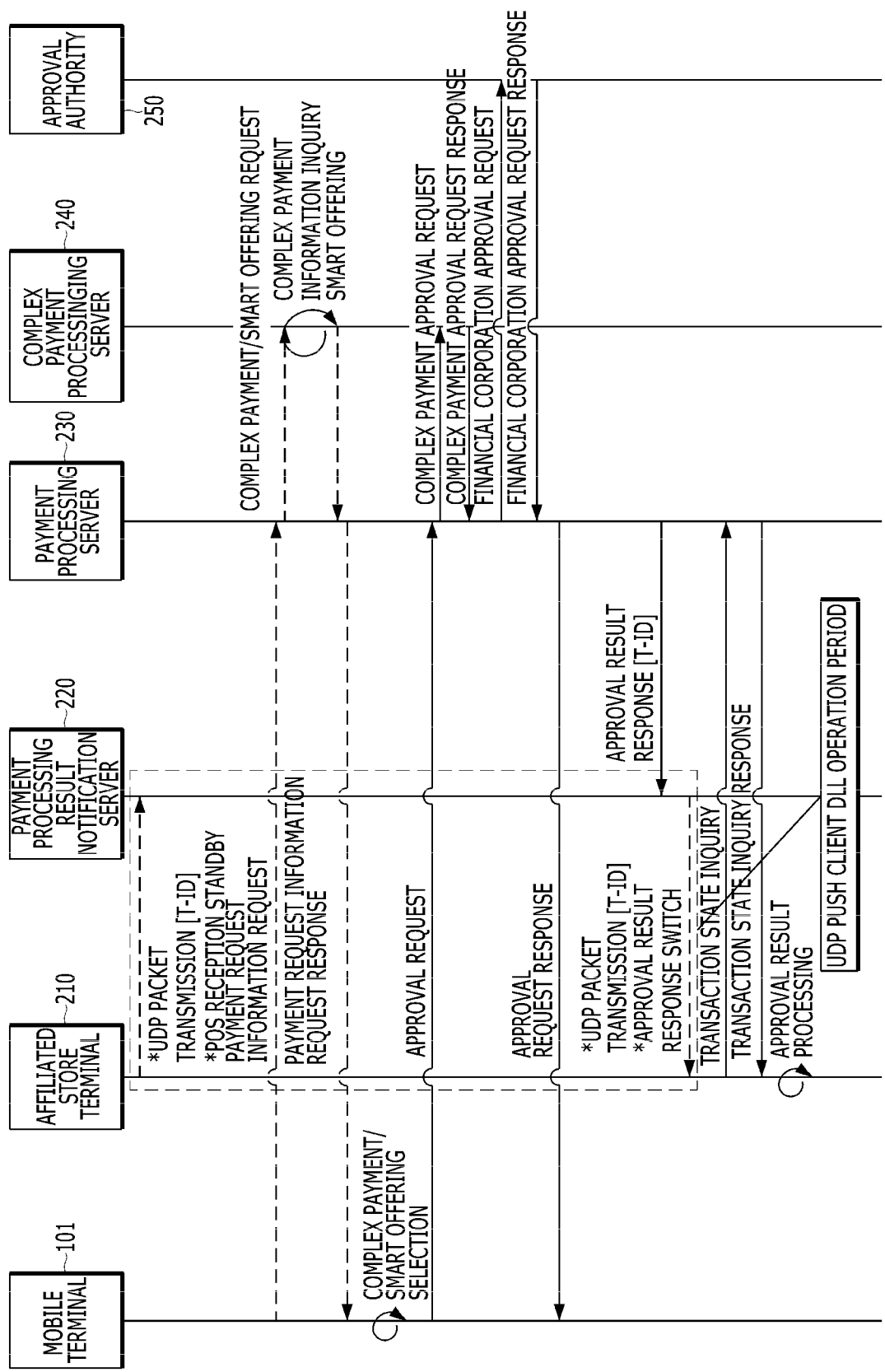

FIGS. 2A and 2B are flowcharts for describing an overall operation in which a mobile payment processing system processes a payment according to an exemplary embodiment of the present invention, and illustrates a difference between the conventional art and the present invention.

In order to prepare for the mobile payment, an affiliated store terminal 210 may calculate the payment amount by inputting a product name, a product volume, etc. to be paid, or receive the payment amount itself, and a mobile terminal 200 may prepare for a payment approval request by executing an application, etc.

When the affiliated store terminal 210 receives a payment request command, the affiliated store terminal 210 may transmit the payment request signal to a payment processing server 230, and the payment processing server 230 receiving the payment request signal may register the payment request, and transmit a payment request response signal to the affiliated store terminal 210.

In the conventional art, the payment processing server 230 may receive the payment-related information (the affiliated store code, the branch store code, the terminal code, the transaction serial number, and the purchase information, etc.) from the affiliated store terminal 210, generate the T-ID information based on the payment-related information, register the payment request, and transmit the payment request response signal including the generated T-ID information to the affiliated store terminal 210. Further, the affiliated store terminal 210 may generate a tag, etc. including the T-ID information, and provide the generated tag so as to be recognizable by the mobile terminal 200 when receiving the T-ID information from the payment processing server 230.

However, in the present invention, the affiliated store terminal 210 may generate the T-ID information based on the payment-related information when receiving the payment request command, and transmit the payment request signal including the generated T-ID information to the payment processing server 230. Further, the affiliated store terminal 210 may provide the T-ID information so as to be recognizable by the mobile terminal 200 regardless of whether the payment request response signal is received from the payment processing server 230 when transmitting the payment request signal. Accordingly, the mobile payment can be rapidly processed without waiting until the payment processing server 230 receives the payment request response signal.

The payment processing server 230 may register the payment request, and confirm whether the payment request having the same T-ID information as that included in the payment approval request signal is registered when receiving the payment approval request signal from the mobile terminal 200. As described above, the payment processing server 230 may receive and obtain the T-ID information generated and transmitted by the affiliated store terminal 210, or receive only the payment-related information including the affiliated store code, etc. from the affiliated store terminal 210, and generate the T-ID information using the same T-ID generation algorithm as that of the affiliated store terminal 210.

The payment processing server 230 may process an operation of processing the corresponding payment request when the payment request having the same T-ID information as that which is transmitted from the mobile terminal 200 is confirmed.

At this time, when the payment request having the same T-ID information is not confirmed, the payment processing server 230 may inquire the payment request again after a predetermined time (for example, five seconds) is passed since the payment request may not be received yet from the affiliated store terminal 210. Alternatively, the payment processing server 230 may allow the user of the mobile terminal 200 to request the confirmation to the affiliated store terminal by transmitting a message indicating that the payment request of making the approval request is not registered to the mobile terminal 200.

The process for the payment request may include an operation in which the payment processing server 230 requests the approval process for the corresponding payment request by connecting to an approval authority 250 server such as the financial corporation, the card corporation, etc., and receives the response signal for the approval request from the approval authority 250 server when the approval request is processed. The payment processing server 230 may inform the mobile terminal 200 that the payment approval request is processed, and the affiliated store terminal 210 may inquire a transaction state by connecting to the payment processing server 230.

At this time, the payment processing server 230 may need to inform the affiliated store terminal 210 that the payment approval is completed, and in the conventional system, when the payment processing server 230 receives the payment request signal from the affiliated store terminal 210 and transmits the payment request response signal for the payment request signal to the affiliated store terminal 210, the affiliated store terminal 210 may not maintain the connection with the payment processing server 230 while the process between the mobile terminal 200 and the payment processing server 230 is performed, and there may be a problem in which the payment processing server 230 cannot transmit a transaction approval result to the affiliated store terminal 210 even when it is determined whether the transaction approval is processed since the payment processing server 230 cannot confirm an address of the affiliated store terminal 210.

Accordingly, according to another exemplary embodiment of the present invention, a payment processing result notification server 220 may be further included, and inform the affiliated store terminal 210 whether the transaction approval is processed by performing the communication using the UDP packet with the affiliated store terminal 210 using the payment processing result notification server 220.

The affiliated store terminal 210 may transmit the UDP packet including the T-ID information to the payment processing result notification server 220 when receiving the payment request response signal from the payment processing server 230 so that the payment processing result notification server 220 finds the UDP address of the affiliated store terminal 210.

When the process between the mobile terminal 200 and the payment processing server 230 is completed, the payment processing server 230 may also transmit a response signal including the T-ID information to the payment processing result notification server 220 when transmitting the response signal for the approval request to the mobile terminal 200. The payment processing result notification server 220 may find the UDP address of the affiliated store terminal 210 which is previously stored using the T-ID information included in the response signal as the index, and transmit the UDP packet including the T-ID information and information regarding whether the transaction approval is processed to the affiliated store terminal 210 so that the user of the affiliated store terminal 210 inquires the transaction state by connecting to the payment processing server 230 without confirming whether the transaction approval is completed from the user of the mobile terminal 200.

Accordingly, the affiliated store terminal 210 may not frequently inquire whether the transaction approval is processed to the payment processing server 230, and thus, a system load of the payment processing server 230 may be reduced.

An exemplary embodiment of the payment processing result notification server 220 described above will be described in detail with reference to FIGS. 3A to 11.

According to still another exemplary embodiment of the present invention, a complex payment processing server 240 capable of simultaneously performing the mobile payment using various kinds of payment means such as a cash, a card, a coupon, or a point, etc. may be further included.

Even when there is or is not the request for the complex payment from the mobile terminal 200, basically, the payment processing server 230 may perform the process for the complex payment by connecting to the complex payment processing server 240 when receiving the payment approval request signal.

The complex payment processing server 240 may inquire the coupon, the point, etc. which is able to be used when processing the corresponding payment when the payment processing server 230 requests information for the complex payment to the complex payment processing server 240, and transmit information in which the user of the mobile terminal 200 is able to use to the payment processing server 230 so as to provide the information to the mobile terminal 200. At this time, the complex payment processing server 240 may generate optimized complex payment information by considering a discount rate, a usage period of the coupon, etc. so as to basically provide the generated information.

The payment processing server 230 may provide the complex payment information receiving from the complex payment processing server 240 to the mobile terminal 200 so that the payment is processed according to the complex payment information selected in the mobile terminal 200.

When the payment approval is completed, the affiliated store terminal 210 may inquire the transaction state to the payment processing server 230, process the approval result when receiving a response signal for the transaction state inquiry from the payment processing server 230, and end the transaction.

Figure 3A:
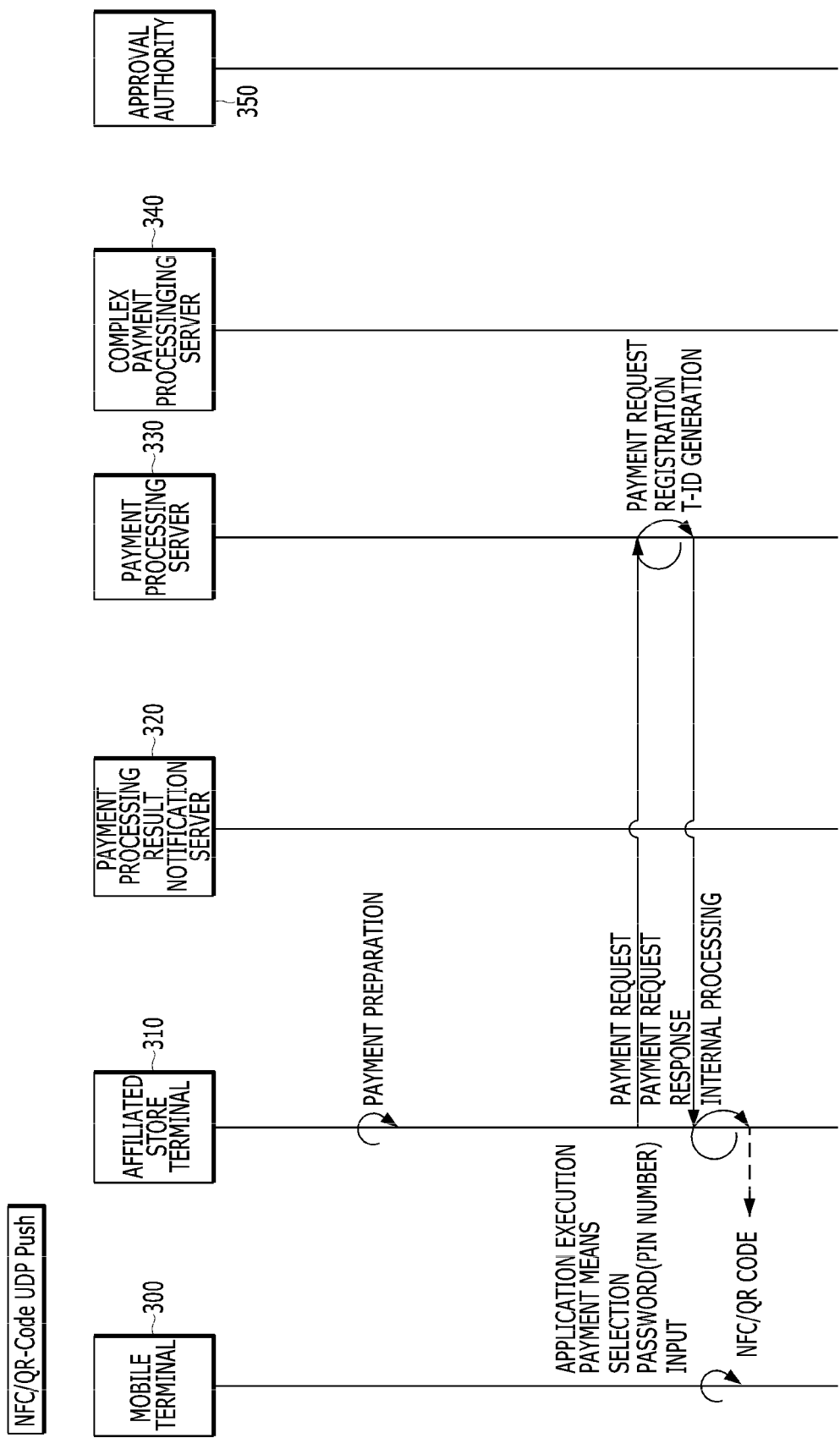
Figure 3B:
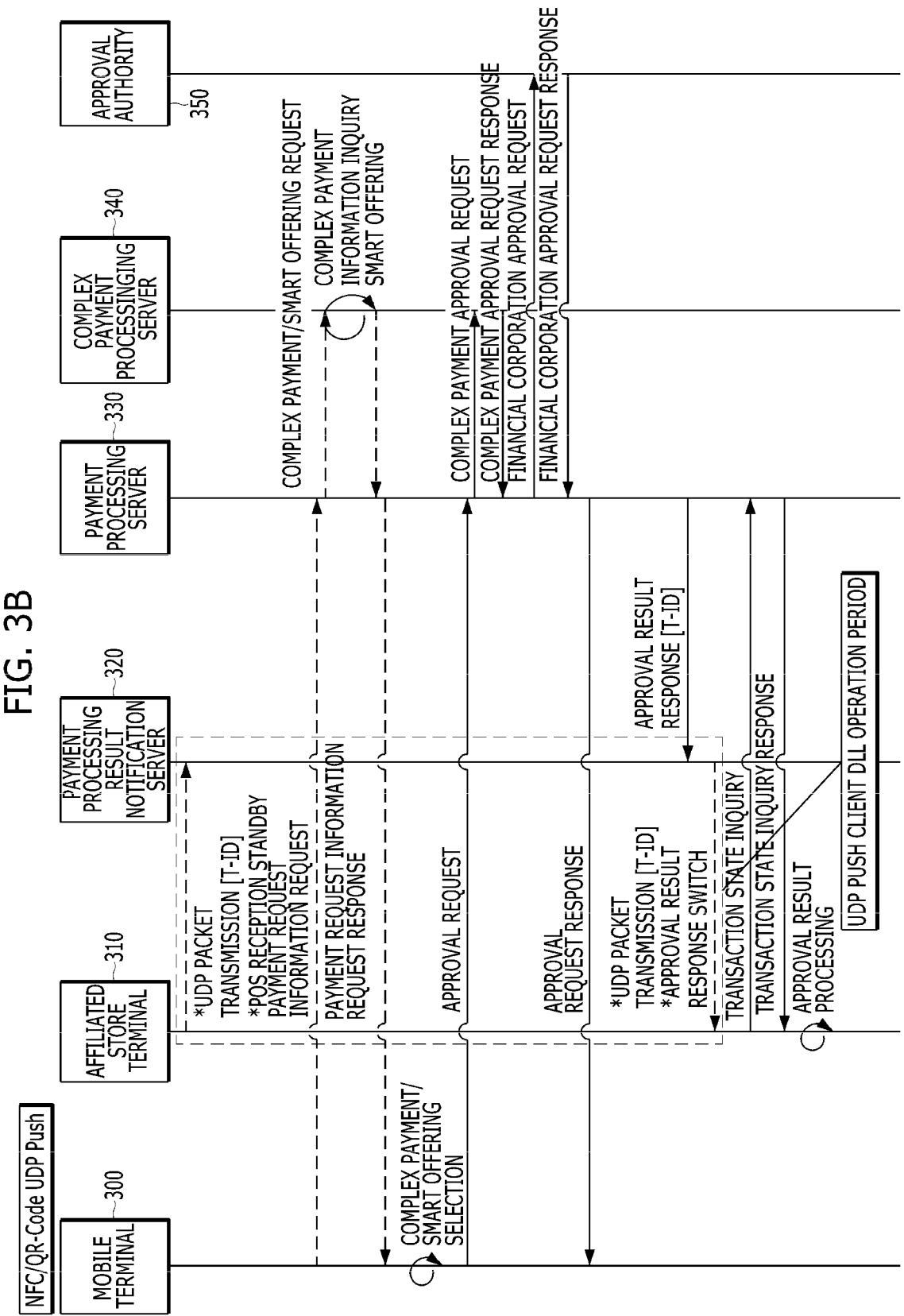

FIGS. 3A, 3B, 4A and 4B are flowcharts for describing an operation of performing a mobile payment using an affiliated store terminal and a payment processing result notification server according to an exemplary embodiment of the present invention, FIGS. 3A and 3B illustrate an example in which an affiliated store terminal 310 generates the tag including the T-ID information, a mobile terminal 300 recognizes the tag, and the payment is performed.

When comparing the operation for the payment process by the conventional mobile terminal 300, the present invention may include a payment processing result notification server 320 performing communication with the affiliated store terminal 310 through UDP communication.

That is, in the present invention, the payment processing result notification server 320 performing the UDP communication with the affiliated store terminal 310 may inform the affiliated store terminal 310 that the payment process is completed by the mobile terminal 300 using the UDP packet for the payment processing result notification even when the affiliated store terminal 310 requests the T-ID information to a payment processing server 330 and does not maintain the communication, and the affiliated store terminal 310 may receive the notification and confirm a detailed payment processing result by connecting to the payment processing server 330.

The transmission through the UDP communication may be a method in which a server or another terminal can transmit a packet to the affiliated store terminal 310 even when the affiliated store terminal 310 has only a private IP address.

An operation of performing the mobile payment including the payment processing result notification server 320 according to an exemplary embodiment of the present invention will be described in detail below.

The affiliated store terminal 310 may prepare for the payment, and make the payment request to the payment processing server 330 (operation 1). When making the payment request, the affiliated store terminal 310 may transmit the payment-related information including the affiliated store code, the branch store code, the terminal code, the transaction serial number, and the purchase information, etc. to the payment processing server 330.

The payment processing server 330 may generate the T-ID information based on the received payment-related information, and transmit the payment request response signal including the generated T-ID information to the affiliated store terminal 310 (operation 2).

As another exemplary embodiment, the payment processing server 330 may not generate the T-ID information, and the affiliated store terminal 310 may directly generate the T-ID information.

The affiliated store terminal 310 may provide the payment-related information to the mobile terminal 300 so that the customer of the mobile terminal 300 recognizes the payment-related information. As a detailed example of the method providing the payment-related information, there may be a method of providing the payment-related information through an RF tag, an NFC tag, a QR code, or a barcode, etc.

The customer may recognize the payment-related information and perform the mobile payment by the method of executing the application in the mobile terminal 300.

The operation in which the customer performs the mobile payment using the mobile terminal 300 may be performed by the communication between the mobile terminal 300 and the payment processing server 330. For example, when the mobile terminal 300 may request the payment request information from the payment processing server 330 and request the payment approval (operation 3), the payment processing server 330 may confirm whether the payment approval is processed through the communication with an approval authority 350 server, and transmit the approval request response signal to the mobile terminal 300 (operation 8). The mobile payment may be completed by the operations described above, and the complex payment using the cash, the card, the coupon, or the mileage may be performed by the communication with a complex payment processing server 340 according to the need.

In the present invention, the affiliated store terminal 310 may not maintain the connection with the payment processing server 330 while the mobile payment is performed by the communication between the mobile terminal 300 and the payment processing server 330 described above, and receive a fact that the payment is processed from the payment processing result notification server 320.

That is, when the affiliated store terminal 310 receives the payment request response signal including the T-ID information from the payment processing server 330 (operation 2), the affiliated store terminal 310 may transmit the UDP packet including the T-ID information to the payment processing result notification server 320, and when the payment processing result notification server 320 receives the payment approval result information including the T-ID information from the payment processing server 330, the payment processing result notification server 320 may transmit the UDP packet for the payment processing result notification including the T-ID information to the affiliated store terminal 310.

The affiliated store terminal 310 may confirm whether the payment is completed by receiving the UDP packet for the payment processing result notification from the payment processing result notification server 320 even when the affiliated store terminal 310 does not maintain the communication with the payment processing server 330. After this, the affiliated store terminal 310 may inquire a detailed transaction result/state by connecting to the payment processing server 330. The UDP communication method between the affiliated store terminal 310 and the payment processing result notification server 320 will be described in detail with reference to FIGS. 5 to 11.

FIGS. 4A and 4B illustrate an operation in which the mobile payment is performed using the barcode generated in the mobile terminal 400.

When an affiliated store terminal 410 recognizes the barcode generated by a mobile terminal 400, the affiliated store terminal 410 may transmit the payment request signal including the payment-related information to a payment processing server 430, and the payment processing server 430 may generate the T-ID information based on the payment-related information, and transmit the payment request response signal including the T-ID information to the affiliated store terminal 410.

The affiliated store terminal 410 receiving the payment request response signal may transmit the UDP packet including the T-ID information to a payment processing result notification server 420, and when the transaction approval is completed, the affiliated store terminal 410 may receive an UDP packet from the payment processing result notification server 420 so as to confirm whether the mobile payment is completed.

Figure 5:
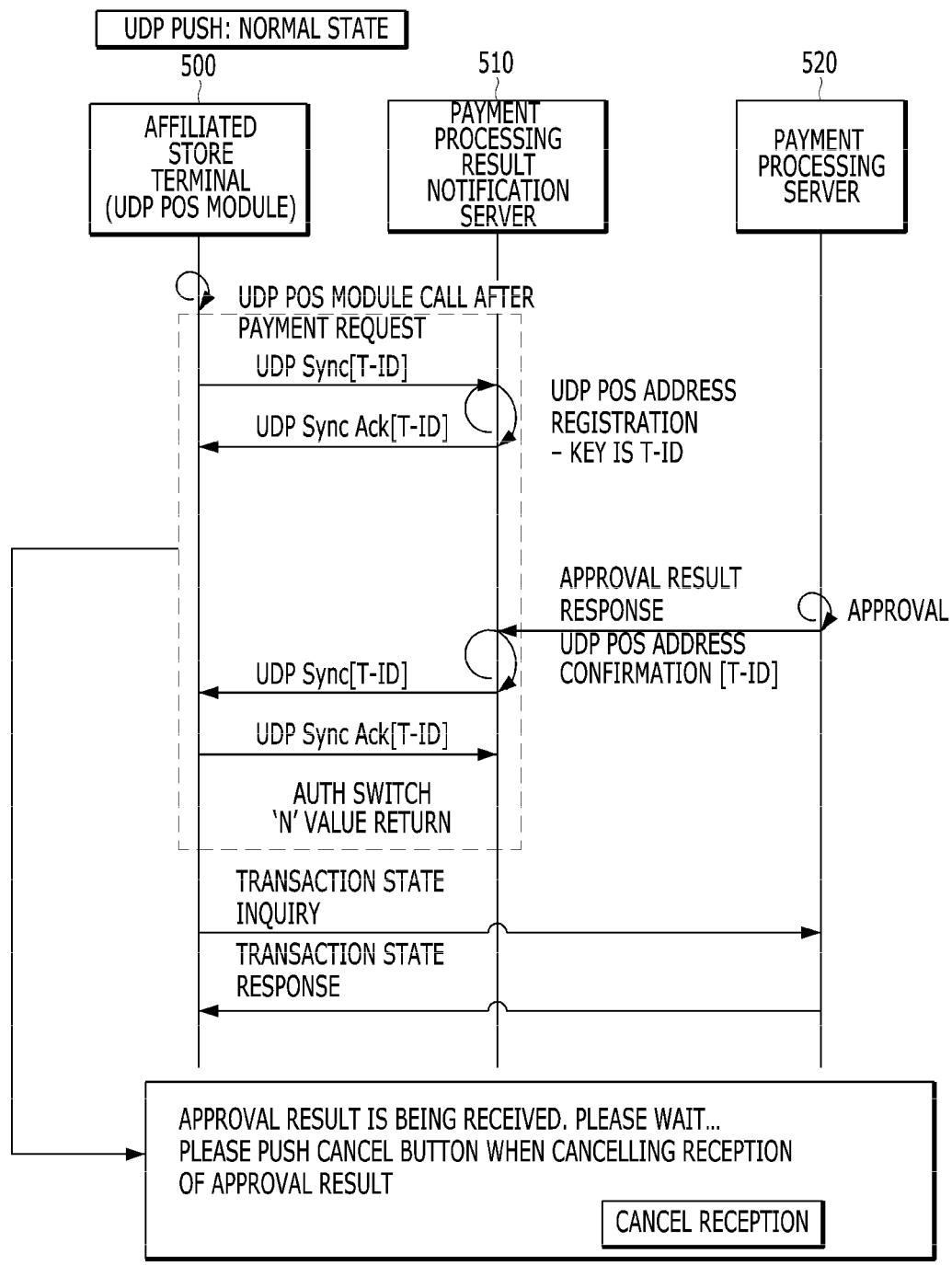
FIGS. 5 and 6 are flowcharts for describing an operation of performing a payment when an affiliated store terminal and a payment processing result notification server are normally operated according to an exemplary embodiment of the present invention.
Figure 6:
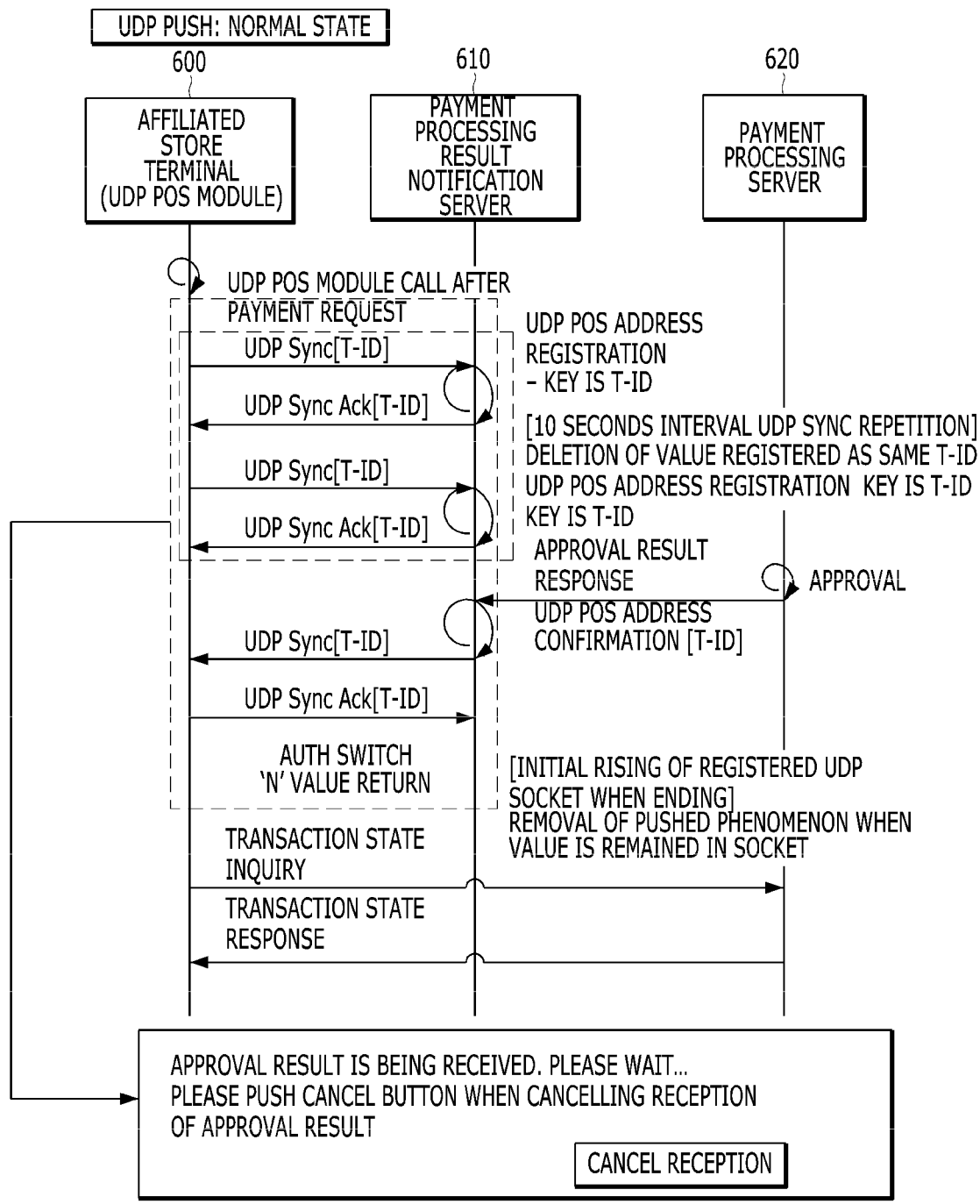

FIGS. 5 and 6 are flowcharts for describing an operation in which an affiliated store terminal and a payment processing result notification server normally perform UDP communication according to an exemplary embodiment of the present invention.

As shown in FIG. 5, an affiliated store terminal 500 may call an UDP point of sales (POS) module and transmit the UDP packet including the T-ID information to a payment processing result notification server 510 when making the payment request to a payment processing server 520 and receiving the payment request response signal.

The payment processing result notification server 510 receiving the UDP packet may register an UDP POS module address having the T-ID information as an index, and transmit the response signal (the first response signal) for the reception of UDP packet to the affiliated store terminal 500. The affiliated store terminal 500 may confirm that the UDP packet is normally transmitted by receiving the first response signal.

Further, the payment processing result notification server 510 may transmit the UDP packet for the payment processing result notification including the T-ID information for the approved payment to the affiliated store terminal 500 when receiving the response signal for the payment approval result from the payment processing server 520. The affiliated store terminal 500 may transmit the response signal (the second response signal) corresponding to the UDP packet for the payment processing result notification which is received to the payment processing result notification server 510, and inquire the transaction state by connecting to the payment processing server 520.

Accordingly, a seller using the affiliated store terminal 500 may confirm whether the payment is completed without manually making a transaction state inquiry request to the payment processing server 520, and output a message indicating that the approval result is being received as shown in FIG. 5 until receiving the UDP packet for the payment processing result notification in order to provide information related a current state to the seller.

FIG. 6 illustrates an example for describing an operation when the UDP POS module address having the same T-ID information as that included in the UDP packet transmitted to a payment processing result notification server 610 as the index is registered, in the process of performing the UDP communication in the normal state as shown in FIG. 5.

The payment processing result notification server 610 may confirm whether the UDP POS address having the same T-ID information as that included in the UDP packet as the index is registered when receiving the UDP packet from an affiliated store terminal 600, and when the UDP POS address having the same T-ID information is registered, delete a previously registered UDP POS module address, and register a newly received UDP POS address.

This is for initializing a registered UDP socket when ending, and for removing a delaying phenomenon when the previously registered UDP POS address is remained in the socket.

FIGS. 7 to 11 are flowcharts for describing a processing method when UDP communication between an affiliated store terminal and a payment processing result notification server is not normally performed according to an exemplary embodiment of the present invention.

Figure 7:
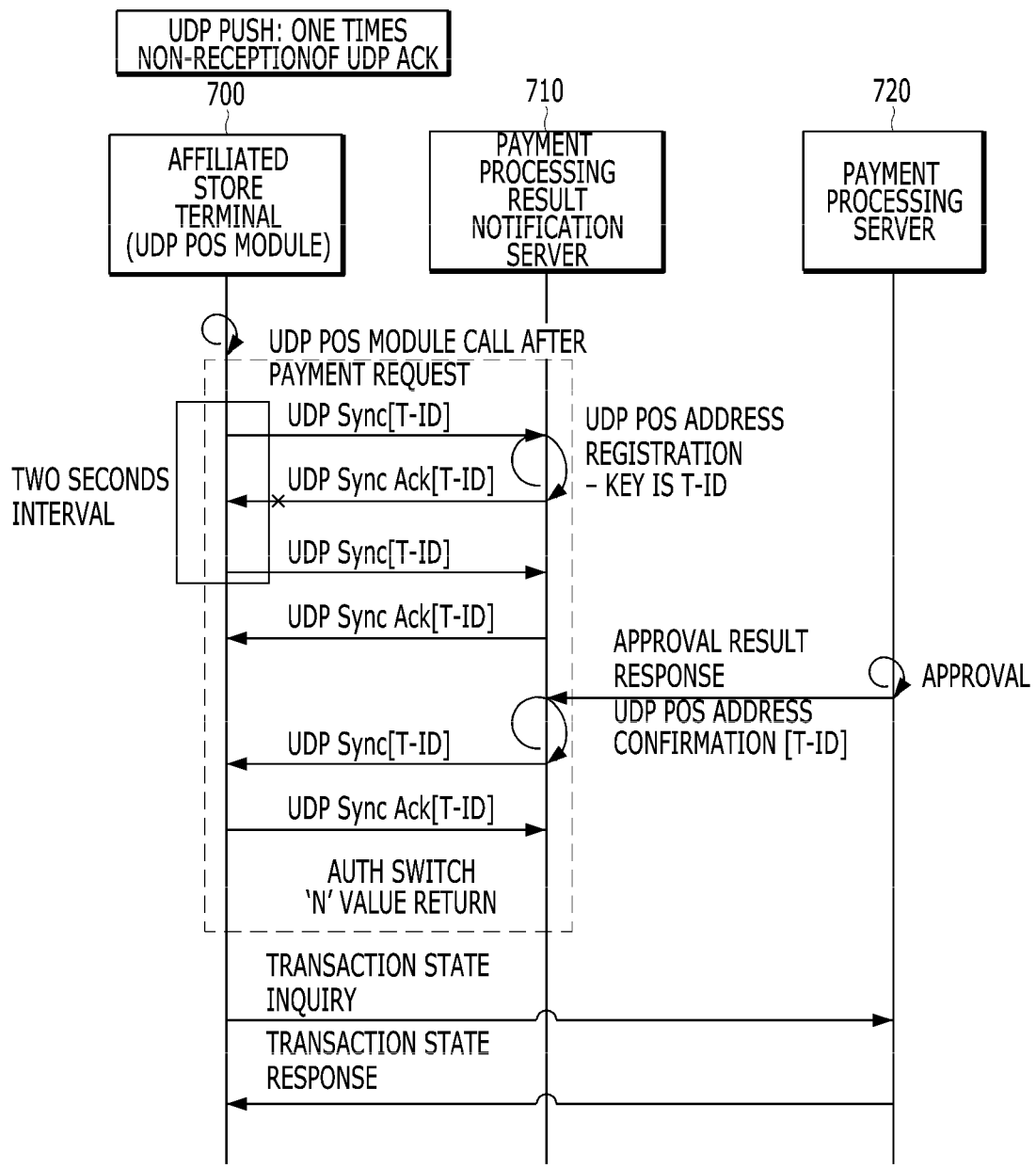
FIGS. 7 to 11 are flowcharts for describing a processing method when an affiliated store terminal or a payment processing result notification server are not normally operated according to an exemplary embodiment of the present invention.
Figure 8:
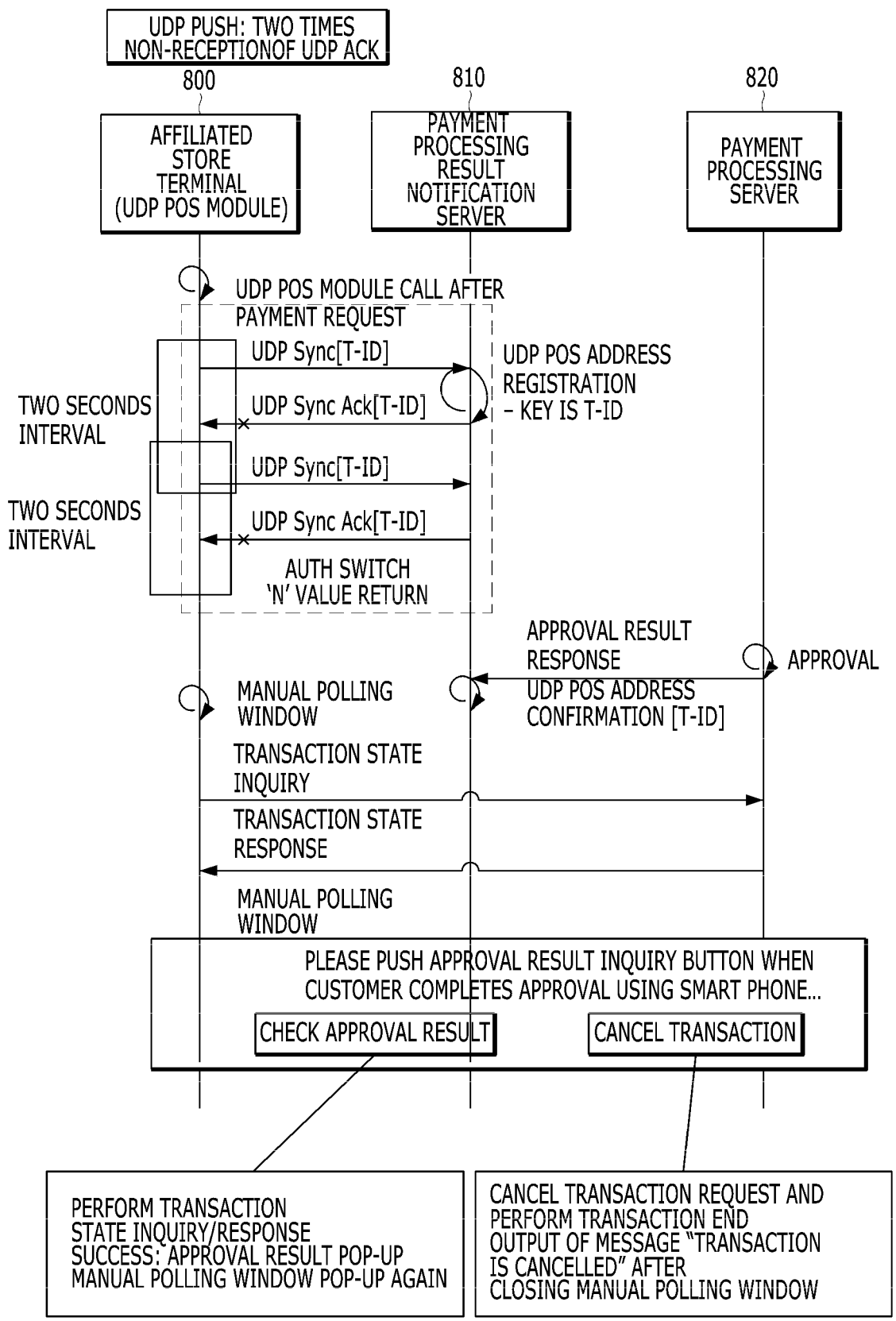

FIGS. 7 and 8 illustrate a processing method when the first response signal for the UDP packet transmitted from affiliated store terminals 700 and 800 is not normally transmitted or received from payment processing result notification servers 710 and 810, and FIG. 7 illustrates an example in which the first response signal is not received one time and FIG. 8 illustrates an example in which the first response signal is not received two times.

As shown in FIG. 7, when the first response signal is not received one time, the affiliated store terminal 700 may transmit the UDP packet again when a predetermined time (for example, two seconds) is passed after transmitting the UDP packet. When the first response signal is received after transmitting the UDP packet again, the affiliated store terminal 700 may wait until receiving the UDP packet for the payment processing result notification transmitted from the payment processing result notification server 710, and inquire the transaction state by connecting to a payment processing server 720 after receiving the UDP packet for the payment processing result notification.

FIG. 8 illustrates an example in which the first response signal is not received two times. The affiliated store terminal 800 may transmit the UDP packet again at intervals of a predetermined time after the first response signal is not received one time, and when the response signal for the UDP packet which is transmitted again is not also received, the seller may manually input the approval result inquiry command and inquire the transaction state like the conventional art by converting into a manual polling window.

This is for a solution of a case in which the UDP communication is not normally performed, and the conversion into the conventional method may be performed according to the number of times in which the first response signal is not received by a setting (for example, the conversion when it is not received two times, the conversion when it is not received five times).

Figure 9:
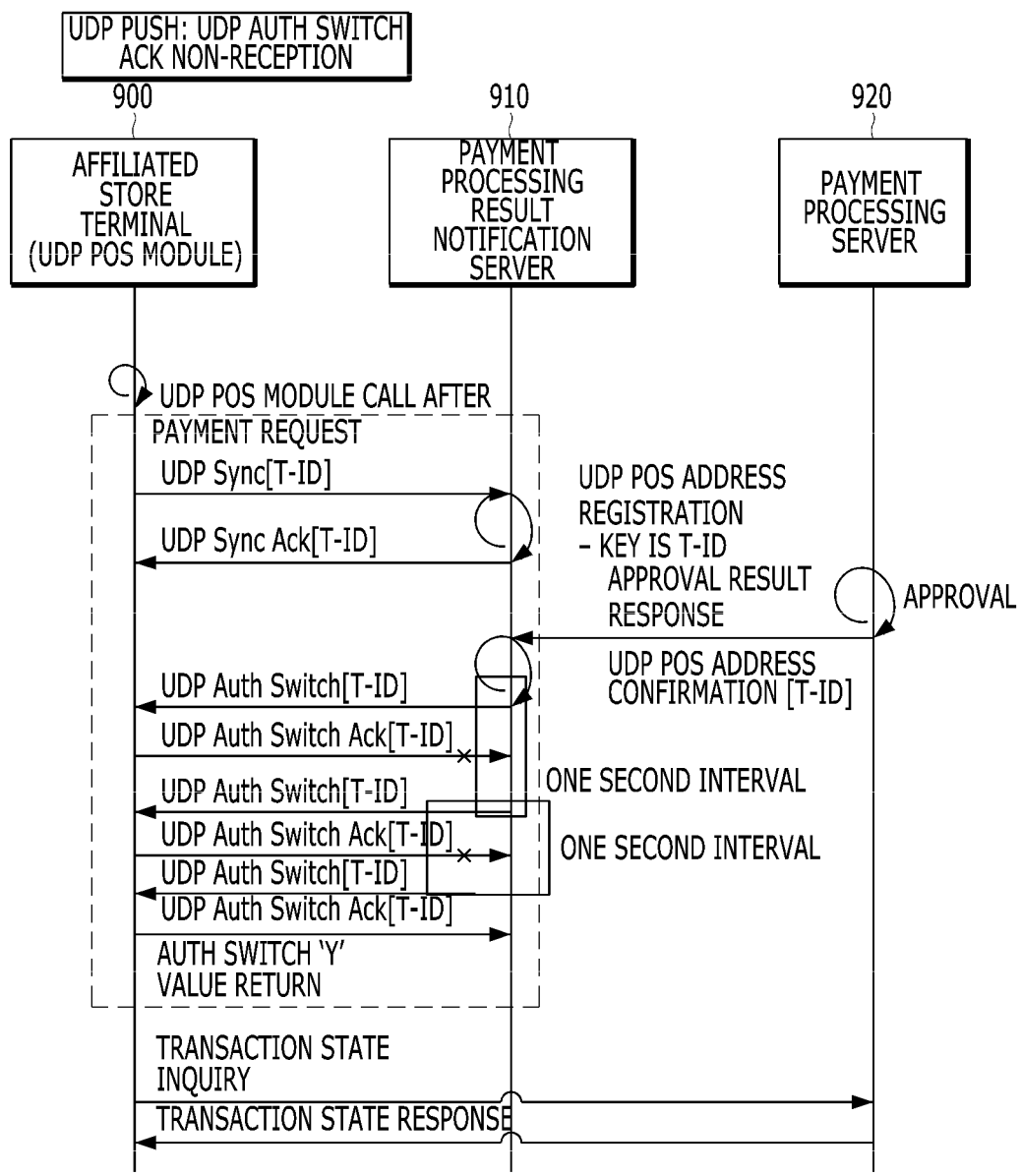
Figure 10:
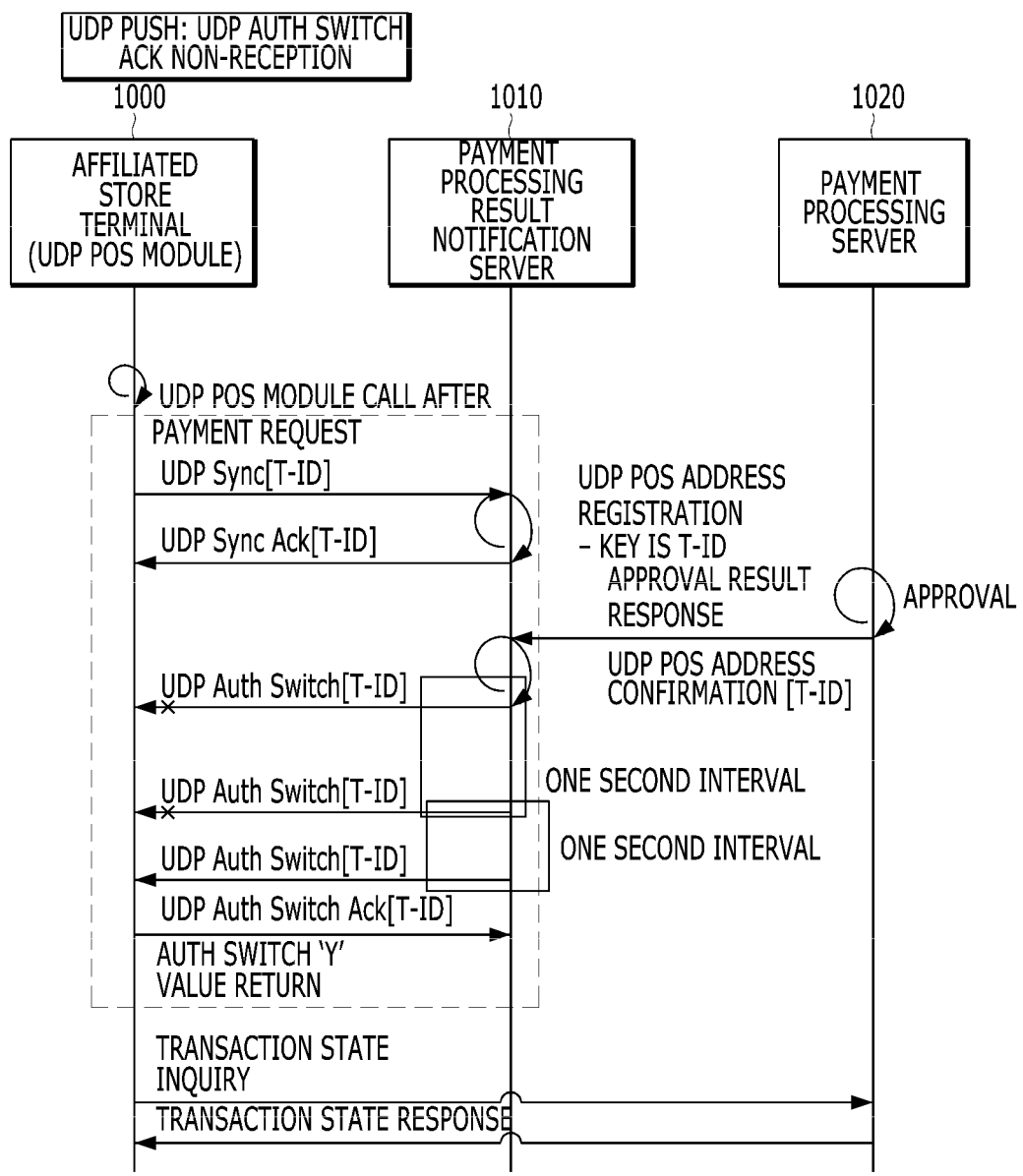

FIGS. 9 and 10 illustrate a processing operation when the UDP packet for the payment approval transmitted by payment processing result notification servers 910 and 1010 is not transmitted or the second response signal transmitted by affiliated store terminals 900 and 1000 receiving the UDP packet for the payment processing result notification is not transmitted.

When receiving the payment approval result information from payment processing servers 920 and 1020, the payment processing result notification servers 910 and 1010 may transmit the UDP packet for the payment processing result notification including the T-ID information to the affiliated store terminals 900 and 1000. Further, when the second response signal is not received within a predetermined time (for example, one second), the payment processing result notification servers 910 and 1010 may again transmit the UDP packet for the payment processing result notification to the affiliated store terminals 900 and 1000 since it is considered that the transmission of the UDP packet for the payment processing result notification is failed or the transmission of the second response signal is failed.

When the second response signal is received by the repeated retransmission of the UDP packet, that is, when the affiliated store terminals 900 and 1000 transmit the second response signal and do not receive the UDP packet for the payment processing result notification from the payment processing result notification servers 910 and 1010, the affiliated store terminals 900 and 1000 may inquire the transaction state by connecting to the payment processing servers 920 and 1020.

At this time, since the transmission or the reception of the UDP packet for the payment processing result notification or the second response signal may be continuously failed, the affiliated store terminals 900 and 1000 may inquire the transaction result by converting into the manual polling window when the number of the transmissions of the second response signal is more than a predetermined number of times or the UDP packet for the payment approval is not received within a predetermined time (for example, thirty seconds or sixty seconds) after receiving the first response signal.

Figure 11:
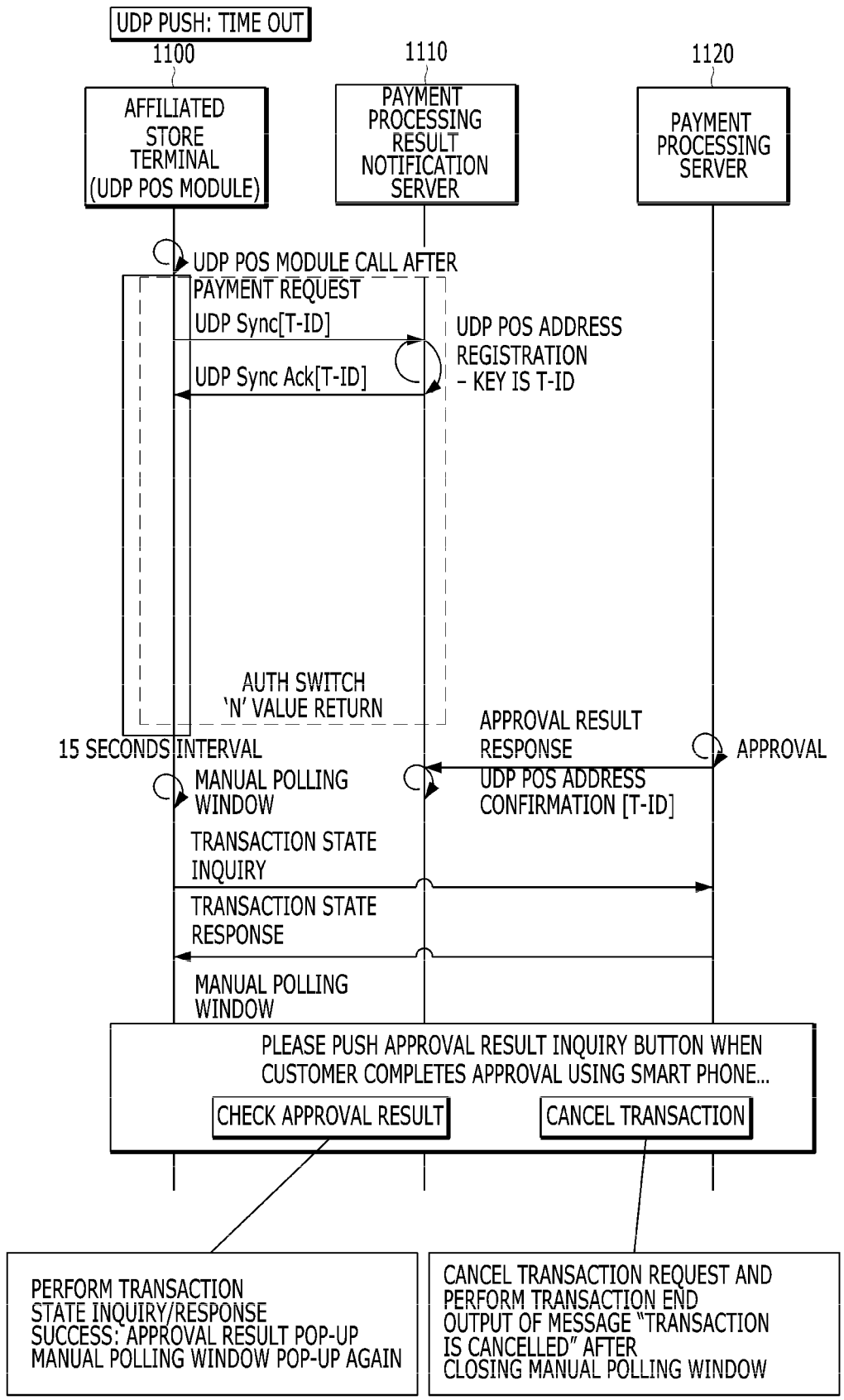

FIG. 11 illustrates a processing operation when an affiliated store terminal 1100 does not receive the UDP packet for the payment processing result notification from a payment processing result notification server 1110 within the predetermined time after transmitting the UDP packet. The affiliated store terminal 1100 may receive the first response signal from the payment processing result notification server 1110 after transmitting the UDP packet, and when the UDP packet for the payment processing result notification from the payment processing result notification server 1110 is not received within a predetermined time (for example, fifteen seconds), the seller may inquire the transaction state by converting into the manual polling window like the conventional method and manually connecting to a payment processing server 1120.

It will be apparent to those skilled in the art that various modifications can be made to the above-described exemplary embodiments of the present invention without departing from the spirit or scope of the invention. Accordingly, the exemplary embodiments of the present invention is for the purpose of describing particular embodiments only and is not intended to be limiting of the invention, and the scope of the present invention is not limited by the exemplary embodiments of the present invention. The scope of the present invention should be defined by the claims, and it is intended that the present invention covers all such modifications provided they come within the scope of the appended claims and their equivalents.

What is claimed is:

1. An affiliated store terminal, comprising:
at least one microprocessor comprising:
a transaction identification information generation unit configured to generate transaction identification (T-ID) information based on payment-related information;
a transaction identification information provision unit configured to provide the T-ID information to a mobile terminal;
a payment request transmission unit configured to transmit a payment request signal including the payment-related information and the T-ID information to a payment processing server at a same time when the transaction identification information provision unit transmits the T-ID information to the mobile terminal, without waiting for a payment request response signal being received from the payment processing server, and receive the payment request response signal including the T-ID information from the payment processing server in response to the payment request signal being transmitted to the payment processing server;
a payment approval confirmation request unit configured to transmit a first user datagram protocol (UDP) packet including the T-ID information to a payment processing result notification server when receiving the payment request response signal, and receive a first response signal from the payment processing result notification server in response to the UDP packet being transmitted to the payment processing result notification server; and
a payment approval confirmation unit configured to receive a second UDP packet for a payment processing result notification including the T-ID information from the payment processing result notification server via UDP connection, without confirming that the mobile terminal has approved a transaction corresponding to the payment request signal, and when receiving the second UDP packet for the payment processing result notification, transmit a second response signal to the payment processing result notification server, and transmit a transaction state inquiry signal to the payment processing server, wherein, when transmitting the payment-related information to the payment processing server, the payment request transmission unit receives the payment request response signal including the T-ID information based on the payment-related information from the payment processing server.

2. The affiliated store terminal of claim 1, wherein the transaction identification information generation unit generates the T-ID information based on an affiliated store code, a branch store code, a terminal code, a transaction serial number, and purchase information.

3. The affiliated store terminal of claim 1, wherein the transaction identification information provision unit provides a medium which is recognizable by the mobile terminal using any one among a radio frequency (RF) tag, a near field communication (NFC) tag, a quick response (QR) code, and a barcode.

4. The affiliated store terminal of claim 1, wherein the transaction identification information provision unit provides the T-ID information to the mobile terminal using wireless communication method including RF communication, optical communication, and infrared-ray communication.

5. The affiliated store terminal of claim 1, wherein, when the payment approval confirmation request unit does not receive the first response signal from the payment processing result notification server for a predetermined time after transmitting the first UDP packet, the payment approval confirmation request unit transmits the first UDP packet again.

6. The affiliated store terminal of claim 1, wherein, when the payment approval confirmation request unit does not receive the first response signal within a predetermined time after transmitting the first UDP packet for the first time, the payment approval confirmation unit outputs a pop-up window for receiving a payment processing result inquiry command from a user.

7. The affiliated store terminal of claim 1, wherein, when the payment approval confirmation request unit does not receive the first response signal while transmitting the first UDP packet by a predetermined number of times, the payment approval confirmation unit outputs a pop-up window for receiving a payment processing result inquiry command from a user.

8. The affiliated store terminal of claim 1, wherein, when the payment approval confirmation request unit does not receive the second UDP packet for the payment processing result notification within a predetermined time after receiving the first response signal, the payment approval confirmation unit outputs a pop-up window for receiving a payment processing result inquiry command from a user.

9. A payment processing result notification device, comprising:
a first communication interface configured to receive a first user diagram protocol (UDP) packet including transaction identification (T-ID) information from an affiliated store terminal receiving a payment request response signal including the T-ID information from a payment processing server, and transmit a first response signal to the affiliated store terminal when receiving the first UDP packet;
a microprocessor comprising a UDP address registration unit configured to register UDP address information of the affiliated store terminal confirmed from the first UDP packet using the T-ID information as an index; and
a second communication interface configured to transmit a second UDP packet for a payment processing result notification including the T-ID information to the affiliated store terminal via UDP connection, without confirming that the mobile terminal has approved a transaction corresponding to the T-ID information when payment processing result information is received from the payment processing server, and receive a second response signal from the affiliated store terminal receiving the second UDP packet for the payment processing result notification.

10. The payment processing result notification device of claim 9, wherein, when the second response signal is not received within a predetermined time after transmitting the second UDP packet for the payment processing result notification, the second communication interface again transmits the second UDP packet for the payment processing result notification.

11. The payment processing result notification device of claim 9, wherein the UDP address registration unit confirms whether T-ID information identical to the T-ID information in the received first UDP packet is registered when receiving the first UDP packet including the T-ID information, and when the T-ID information identical to the T-ID information in the received first UDP packet is registered, deletes UDP address information having the previously registered T-ID information as an index.

12. A mobile payment processing system, comprising:
an affiliated store terminal configured to generate transaction identification (T-ID) information based on payment-related information, transmit a payment request signal including the T-ID information, and provide the T-ID information to a mobile terminal;
a payment processing server configured to register a payment request when receiving the payment request signal, inquire a payment request registered based on the T-ID information included in a payment approval request signal when receiving the payment approval request signal transmitted by the mobile terminal obtaining the T-ID information provided by the affiliated store terminal, and process a payment approval request; and
a payment processing result notification server,
wherein the affiliated store terminal is further configured to transmit a first user datagram protocol (UDP) packet including the T-ID information to the payment processing result notification server when receiving a payment request response signal corresponding to the payment request signal transmitted to the payment processing server,
wherein the affiliated store terminal is further configured to transmit the T-ID information to the payment processing server and the mobile terminal at a same time, without waiting for the payment request response signal being received from the payment processing server, and
wherein the payment processing result notification server is configured to transmit the T-ID information to the affiliated store terminal via UDP connection, without confirming that the mobile terminal has approved a transaction corresponding to the payment request signal.

13. The mobile payment processing system of claim 12, wherein the payment processing result notification server transmits a second UDP packet for a payment processing result notification including the T-ID information to the affiliated store terminal when receiving payment processing result information from the payment processing server.

14. The mobile payment processing system of claim 13, wherein the affiliated store terminal inquires a transaction state by connecting to the payment processing server when receiving the second UDP packet for the payment processing result notification.

15. The mobile payment processing system of claim 12, further comprising a complex payment processing server, and
wherein the payment processing server performs a complex payment by one or more payment means by connecting to the complex payment processing server when a complex payment processing request is included in the payment approval request signal.

16. A mobile payment processing method performed in an affiliated store terminal, the mobile payment processing method comprising:
generating transaction identification (T-ID) information based on payment-related information;
transmitting a payment request signal including the T-ID information to a payment processing server;
providing the T-ID information to a mobile terminal;
receiving a payment request response signal from the payment processing server receiving a payment approval request signal transmitted by the mobile terminal obtaining the T-ID information;
transmitting a user datagram protocol (UDP) packet including the T-ID information to a payment processing result notification server when receiving the payment request response signal;
receiving a UDP packet for a payment processing result notification including the T-ID information from the payment processing result notification server via UDP connection, without confirming that the mobile terminal has approved a transaction corresponding to the payment request signal, when the payment processing result notification server receives payment processing result information from the payment processing server; and
inquiring a transaction state by connecting to the payment processing server when receiving the UDP packet for the payment processing result notification,
wherein the transmitting the payment request signal comprises transmitting the T-ID information to the payment processing server and the mobile terminal at a same time, without waiting for the payment request response signal being received from the payment processing server.

17. A mobile payment processing method performed in an affiliated store terminal, the mobile payment processing method comprising:
transmitting a payment request signal from the affiliated store terminal to a payment processing server and a mobile terminal at a same time, without waiting for a payment request response signal being received from the payment processing server;
receiving the payment request response signal including transaction identification (T-ID) information generated by the affiliated store terminal or the payment processing server from the payment processing server;
transmitting a first user datagram protocol (UDP) packet including the T-ID information to a payment processing result notification server when receiving the payment request response signal;
receiving a first response signal from the payment processing result notification server receiving the first UDP packet; and
receiving a second UDP packet for a payment processing result notification related to the T-ID information from the payment processing result notification server via UDP connection, without confirming that the mobile terminal has approved a transaction corresponding to the payment request signal, when the payment processing result notification server receives payment processing result information from the payment processing server.

18. The mobile payment processing method performed in an affiliated store terminal of claim 17, wherein the transmitting of the first UDP packet including the T-ID information to the payment processing result notification server includes retransmitting the first UDP packet when the first response signal is not received within a predetermined time after transmitting the first UDP packet.

19. The mobile payment processing method performed in an affiliated store terminal of claim 17, further comprising:
outputting a pop-up window for receiving a payment processing result inquiry command from a user when the first response signal is not received within a predetermined time after transmitting the first UDP packet for the first time; and
inquiring a payment processing result by connecting to the payment processing server when receiving a payment processing result inquiry command through the pop-up window.

20. The mobile payment processing method performed in an affiliated store terminal of claim 17, further comprising:
outputting a pop-up window for receiving a payment processing result inquiry command from a user when the first response signal is not received while transmitting the first UDP packet by a predetermined number of times; and
inquiring a payment processing result by connecting to the payment processing server when receiving a payment processing result inquiry command through the pop-up window.

21. The mobile payment processing method performed in an affiliated store terminal of claim 17, further comprising:
outputting a pop-up window for receiving a payment processing result inquiry command from a user when the first UDP packet for the payment processing result notification is not received within a predetermined time after receiving the first response signal; and
inquiring a payment processing result by connecting to the payment processing server when receiving a payment processing result inquiry command through the pop-up window.

* * * * *